(12) United States Patent
Kreifeldt et al.

(10) Patent No.: US 10,250,650 B2
(45) Date of Patent: Apr. 2, 2019

(54) DISCOVERY PLAYLIST CREATION

(71) Applicant: Harman International Industries, Incorporated, Stamford, CT (US)

(72) Inventors: Richard Allen Kreifeldt, South Jordan, UT (US); Michelle L. Avary, Menlo Park, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 432 days.

(21) Appl. No.: 14/589,856

(22) Filed: Jan. 5, 2015

(65) Prior Publication Data

US 2016/0197967 A1    Jul. 7, 2016

(51) Int. Cl.
*H04L 29/06*  (2006.01)
*G06F 17/30*  (2006.01)
*G06K 9/00*   (2006.01)
*H04L 29/08*  (2006.01)

(52) U.S. Cl.
CPC ...... *H04L 65/403* (2013.01); *G06F 17/30766* (2013.01); *G06K 9/00255* (2013.01); *G06K 9/00288* (2013.01); *H04L 65/60* (2013.01); *H04L 67/22* (2013.01)

(58) Field of Classification Search
CPC . H04L 65/403; H04L 29/06; G06F 17/30766; G06K 9/00288
See application file for complete search history.

(56) References Cited

U.S. PATENT DOCUMENTS

2010/0030772 A1*  2/2010  Zilca ............. G06F 17/30702
                                              705/319
2012/0290653 A1* 11/2012  Sharkey ............. H04W 4/023
                                              709/204

(Continued)

FOREIGN PATENT DOCUMENTS

| EP | 2161668 A1 | 3/2010 |
| WO | 0232136 A1 | 4/2002 |
| WO | 2012154412 A1 | 11/2012 |

OTHER PUBLICATIONS

Extended European Search Report Application No. 15200118.6 dated May 20, 2016, 9 pages.

*Primary Examiner* — Leron Beck
*Assistant Examiner* — Berteau Joisil
(74) *Attorney, Agent, or Firm* — Artegis Law Group, LLP

(57) ABSTRACT

One embodiment provides a non-transitory medium containing computer program code that performs an operation that includes retrieving, for each of two or more identified users, a respective musical preferences model representing a plurality of acoustical characteristics of musical content determined based on preferences of the respective user. Additionally, the operation includes generating a common musical preferences model representing a set of common acoustical characteristics of musical content for the two or more identified users, based on the musical preferences models for each of the two or more identified users. The operation also includes identifying a library of available musical content. Furthermore, the operation includes creating a playlist of two or more musical selections from the library of available musical content, based on the common musical preferences model.

22 Claims, 6 Drawing Sheets

(56) References Cited

U.S. PATENT DOCUMENTS

2015/0206523 A1\* 7/2015 Song .................... G10H 7/002
  84/609
2016/0065884 A1\* 3/2016 Di Censo ............... H04N 5/765
  386/227

\* cited by examiner

DISCOVERY PLAYLIST CREATION

BACKGROUND

Field of the Invention

The present disclosure relates to infotainment systems, and more particularly, to generating a combined playlist tailored to the musical preferences of multiple users within the immediate physical environment.

Description of the Related Art

Today interconnected devices are more common than ever before and the popularity of such devices is continuing to increase at a rapid pace. For instance, it is not uncommon for a person to have a mobile device (e.g., a smart phone), a television, a tablet computing device, a media player and a vehicle navigation system. As more and more devices are built with the capability and logic to communicate with other devices, new possibilities are unlocked for providing a completely integrated experience for a user.

Traditionally, for the playback of musical content, users have had the option of manually creating their own personalized playlist (e.g., dynamically by selecting various songs for playback, in advance by creating a list of songs for playback on a computerized device, etc.) or listening to generalized playlists on radio stations that are not personalized for the user in question. As technology has evolved, infotainment devices and techniques have been created that are capable of producing a playlist that is personalized for a particular user. However, while conventional playlist creation techniques can better approximate a particular user's likes and dislikes with respect to musical content, such techniques at best model a user's general musical tastes and do not account for the user's specific circumstances.

SUMMARY

One embodiment provides computer-readable medium having computer code embodied thereon that is configured to, when executed, perform an operation. The operation includes retrieving, for each of two or more identified users, a respective musical preferences model representing a plurality of acoustical characteristics of musical content determined based on preferences of the respective user. The operation also includes generating a common musical preferences model representing a set of common acoustical characteristics of musical content for the two or more identified users, based on the musical preferences models for each of the two or more identified users. Additionally, the operation includes identifying a library of available musical content. The operation further includes creating a playlist of two or more musical selections from the library of available musical content, based on the common musical preferences model.

Another embodiment provides a system that includes one or more sensors configured to identify two or more users and logic that, when carried out, performs an operation. The operation includes retrieving, for each of two or more identified users, a respective musical preferences model representing a plurality of acoustical characteristics of musical content determined based on preferences of the respective user. The operation also includes generating a common musical preferences model representing a set of common acoustical characteristics of musical content for the two or more identified users, based on the musical preferences models for each of the two or more identified users. Additionally, the operation includes identifying a library of available musical content. The operation further includes creating a playlist of two or more musical selections from the library of available musical content, based on the common musical preferences model.

Yet another embodiment provides a method that includes receiving a request specifying two or more users. The method also includes determining, for each of the two or more users, a respective musical preferences model representing a plurality of acoustical characteristics of musical content determined based on preferences of the respective user. Additionally, the method includes generating a common musical preferences model representing a set of common acoustical characteristics of musical content for the two or more users, based on the musical preferences models for each of the two or more users. The method further includes transmitting, over a communications network, to a media playback device, the generated model for use in creating a playlist of two or more musical selections from a library of available musical content.

DETAILED DESCRIPTION

Figure 1:
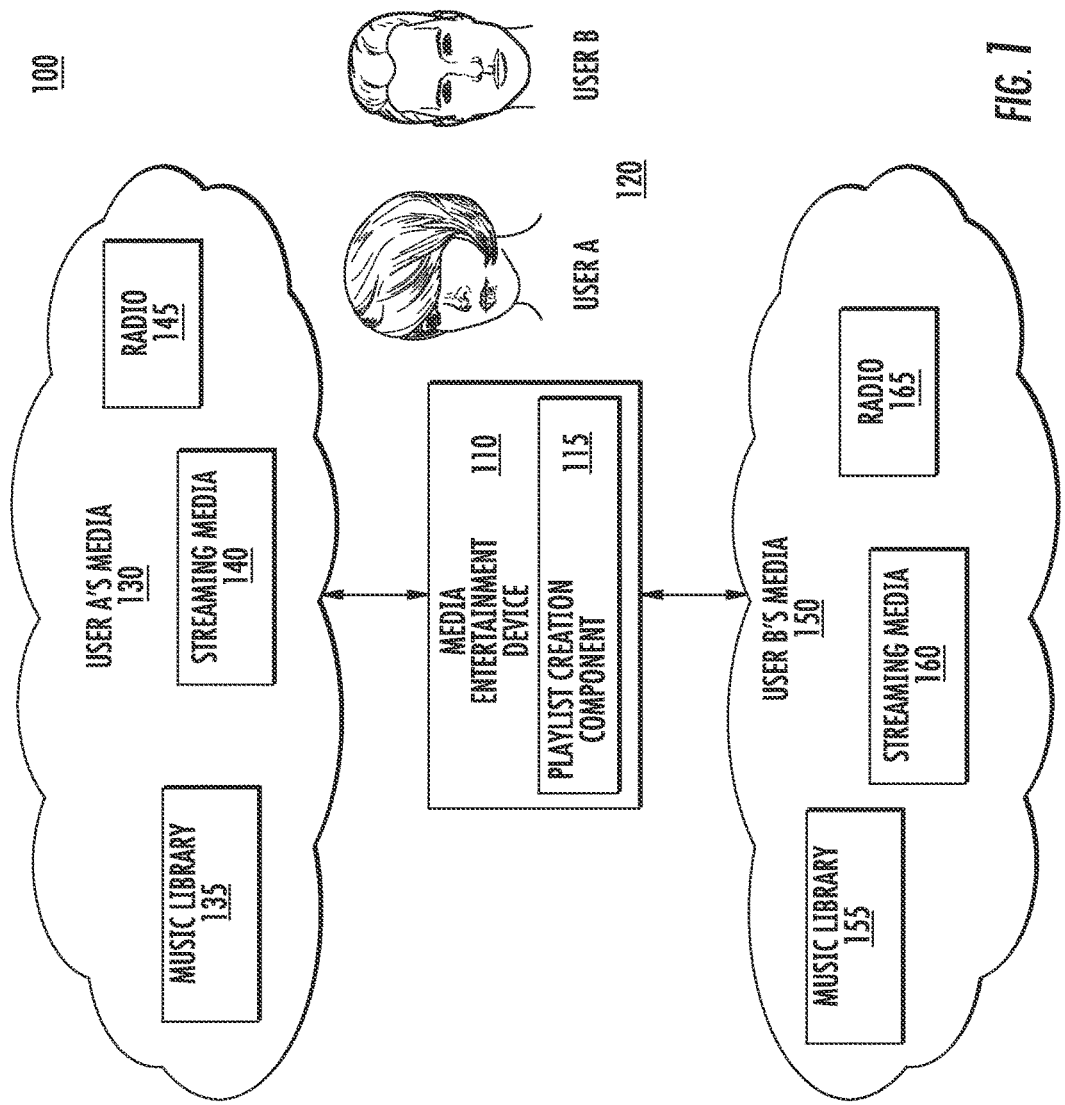
FIG. 1 is a diagram illustrating a system configured with a playlist creation component, according to one embodiment described herein.

Music is in many ways social and is frequently shared between multiple individuals. However, while conventional techniques may tailor a playlist around an individual's personal preferences, such techniques are unable to create joint music playlists for sharing music between multiple individuals. While two or more individuals may share some musical preferences, rarely are one user's individual musical preferences identical to another user's musical preferences. As such, a playlist created solely based on one user's individual preferences may include certain musical selections that are pleasing to another user (e.g., where the users' musical preferences overlap), but may include other songs that the other user dislikes.

Additionally, the process of music discovery has become increasingly reliant on broadcast radio, yet the selection of content played by broadcast radio stations has gradually been reduced as broadcast radio stations become increasingly risk adverse with respect to musical selections outside of the mainstream. As such, at a time when the vast majority of people are reliant on broadcast radio to discover new artists and musical selections, the diversity of content played by broadcast radio stations is decreasing. Accordingly, it is becoming increasingly difficult for individuals to discover new musical content outside of the mainstream. Nonetheless, music discovery is still an important process, as introducing users to new content enriches the users' experience and, from a commercial perspective, increases the universe of musical content that the users are likely to purchase.

As such, embodiments provide techniques for generating a playlist tailored to the preferences of multiple users within the proximate physical environment. According to one embodiment, logic on a media player device identifies two or more users present within a physical environment. In identifying the users, the logic can use a number of different identification techniques, including facial recognition, voice recognition, biometric recognition, other identification techniques or some combination therebetween. For example, a media player device operating within a vehicle (e.g., a user's automobile) could capture images of the driver and the passengers within the vehicle. The logic could then perform a facial recognition analysis of the captured images to identify the users within the vehicle from a library of recognized users. Generally, as used herein, a recognized user refers to any user the system is capable of identifying using predefined data relating to the user. For example, the users within the vehicle could have previously created a user profile with the vehicle and such user profiles could include one or more images captured of the respective user. The media player could then match the images captured of the users currently within the vehicle to the predefined images within the user profiles in order to identify the users currently present within the vehicle.

The media player could further determine, for each of users, respective preference information describing musical preferences of the respective user. For instance, the user profiles could each specify a preferences model that describes the respective user's musical preferences. For example, each preference model could specify acoustical characteristics that the respective user has an affinity towards and could further specify a preference strength value for each of the acoustical characteristics indicating a respective strength of the affinity. Generally, such a model could be generated based on the user's previous interactions with the media player and/or other media players and services. For example, logic on the media player could generate an initial model for the user based on the user's locally available media content (e.g., musical selections available for playback from local storage within the vehicle), metadata describing the user's previous interactions with the locally available media content (e.g., which songs a user listens to most, artists the user listens to, genres of music the user listens to, how often the user listens to particular songs, etc.). Additionally, the media player could take into account other preferences information which the media player has access to (e.g., based on a privacy policy specified in the user profile). Examples of such other information include, without limitation, radio stations the user listens to on the media player as well as other media devices (e.g., online streaming radio stations), musical content the user owns and/or listens to on other media players (e.g., a library of musical content the user maintains in remote cloud storage), social network interactions (e.g., interactions between the user and artists on a social networking site), and so on in generating the model. More generally, it is broadly contemplated that embodiments can take into account any available information that can be indicative of the user's musical preferences.

The media player can then generate a shared preferences model that describes common musical preferences between the two or more users, based on the respective models information for each of the two or more users. In doing so, the media player can identify acoustical characteristics that overlap across all of the individual preferences for the users for inclusion in the shared preferences model. For example, the media player could determine that all users within the proximate physical environment enjoy a particular sub-genre of jazz music, based on the individual preferences models for each of the users. Additionally, the media player could determine a combined preference strength value for the sub-genre of jazz music, indicating how strong of an affinity the users have for the sub-genre. For example, the media player could compute an average preference strength value from the respective preference strength values within the individual preference models. Of course, such an example is for illustrative purposes only and without limitation, and more generally, any technique for generating a combined preferences model can be used, consistent with the present disclosure.

The media player can then identify a library of available musical content for the two or more users and can use the shared preferences model to create a playlist of two or more musical selections from the library of available musical content. For example, the media player could determine that a network connection (e.g., an Internet connection) exists over which musical content can be streamed, and thus the media player could determine that the library of available musical content includes both locally available media content and streamable media content (e.g., from one or more streaming sources available to at least one of the users in the immediate physical environment). As another example, upon determining that no network connection is available, the media player could determine a collection of locally available musical content. For example, in an embodiment where the media player resides within a user's vehicle, the media player could identify all musical content on the media player's local storage devices as well as musical content available for playback from the users' mobile devices (e.g., over a wireless connection such as Bluetooth®).

Once the library of available musical content is identified, the media player can select particular instances of musical content from the library for inclusion in the playlist, based on the shared preferences model. Generally, the media player can select instances of musical content having acoustical properties that match the combined preferences of the identified users. Of note, while the selected instances of musical content may generally match the users' combined preferences, certain instances may still be new to a particular one of the users. For example, continuing the above example where the users share a preference for a particular sub-genre of jazz music, a particular song matching the sub-genre could be selected from one user's content library that another one of the users has never heard before, thereby facilitating the discovery of new music for the users.

In addition to selecting instances directly matching the preferences model, the media player can be configured to also include related musical selections from one user's individual preferences model. For example, the media player could include a selection from a different sub-genre of jazz that one of the users has a strong affinity towards, based on the user's individual preferences model. Doing so provides an improved music discovery process, as users may be more likely to take recommendations for undiscovered musical content from their friends, relative to similar recommendations from unknown sources. The media player could also select discoverable music (e.g., music available for remote streaming but not currently purchased by any of the users) that is determined to match the musical preferences described by the combined preferences model for inclusion on the playlist. For example, the media player could employ a machine algorithm to select selections of discoverable music that are acoustical similar to the preferences described in the shared preferences model. Doing so allows the users to discover new music in a safe and social environment and increases the likelihood that the users will enjoy the new, discoverable music through the use of the combined preferences model.

In selecting discovery content for the users, the media player can take into account additional user information such as a measure of how adventurous a particular user has historically been with respect to musical content. For instance, the media player could determine that a particular user has historically been very adventurous when trying new, undiscovered musical content, and thus the media player could tend to select more discovery content for the particular user. On the other hand, the media player could determine that another user has historically been very conservative with respect to discovering new musical content and predominately listens to substantially the same set of musical selections. When generating the shared preferences model based on the individual preferences of both of these users, the media player could substantially avoid selecting discovery titles that do not directly match the conservative user's musical preferences, based on the conservative user's music listening history.

In addition to selecting musical content for inclusion on the playlist, the media player can dynamically generate a log of the playlist that includes all relevant metadata describing the selections of musical content (e.g., artist name, album name, genre, sub-genre, etc.). In creating such a log, the media player could create an individualized log for each of the users, emphasizing music that the particular user has not yet purchased and/or does not have rights to listen to (e.g., via a subscription service). Such a log could further include links through which the user can purchase the musical content. Generally, the log can take any number of different forms, with examples including (without limitation) email messages, screens of a native application (e.g., on a user's mobile device), screens of a web application, and so on. Doing so exposes the user to new music in a safe, social environment and facilitates the purchase of new music by the users, thereby providing an improved music discovery process.

FIG. 1 is a diagram illustrating a system configured with a playlist creation component, according to one embodiment described herein. As shown, the system 100 includes a media entertainment device 110 that is capable of discovering user A's media content 130 as well as user B's media content 150. For purposes of this example, the users A and B 120 represent the users identified within the media entertainment device's 110 surrounding physical environment.

As shown, the media entertainment device 110 is configured with a playlist creation component 115. As discussed above, the playlist creation component 115 can generally be configured to create a playlist tailored to the musical preferences of the users 120 present within the media player device's 110 surrounding physical environment. For example, in an embodiment where the media player device 110 is configured to operate within the cabin of a vehicle, the playlist creation component 115 could identify the users 120 as present within the vehicle's cabin. For example, the playlist creation component 115 could capture one or more images of the vehicle's cabin using I/O devices such as a camera sensor(s). The playlist creation component 115 could then perform a facial recognition algorithm to identify one or more faces within the captured images and could match the recognized faces with predefined user facial data corresponding to recognized users of the vehicle. That is, the users 120 could have each created a user profile that includes a previously capture image(s) of the respective user, and the playlist creation component 115 could match the images captured within the vehicle's cabin to the predefined images within the user profiles in order to identify the users. As another example, the playlist creation component 115 could collect biometric data (e.g., weight, average heart rate, etc.) from users within the vehicle (e.g., using I/O devices such as biometric sensors located within each seat of the vehicle) and could identify the users by matching the monitored biometric data to predefined biometric data corresponding to recognized users of the vehicle. More generally, any suitable technique for identifying the users can be used, consistent with the functionality described herein.

The playlist creation component 115 can generate or otherwise obtain an individual musical preferences model for each of the users 120, based on the user's respective media content and history. Generally, such a model describes acoustical characteristics of musical content the particular user has an affinity for. For example, the model could specify that the user has an affinity for Rock music and could specify a number of metadata values (or ranges) that describe acoustical characteristics of the type of Rock music the particular user enjoys. Examples of such metadata could include, without limitation, tempo, loudness, aggressiveness, accousticalness, a ratio of vocals to instrumentals, musical key(s), and so on. For example, the model could specify that a particular user enjoys Rock music in a particular range of aggressiveness, having loudness in another range, and so on. An example of such a model is shown below in Example 1:

---

Example 1 - Exemplary XML Preference Model

```
<model>
    <group>
        <genre>Rock</genre>
        <era begin="1988" end="1999"/>
        <tempo begin="75" end="140"/>
        <loudness begin="44" end="68"/>
        <aggressiveness begin="4" end="8"/>
        <melodic begin="61" end="90"/>
        <spokenness begin="0" end="7"/>
        <vocal-to-instrumental begin="0.7" end="1.4"/>
    </group>
    <group>
        <genre>Hip Hop</genre>
        <era begin="1981" end="1995"/>
        <tempo begin="95" end="135"/>
        <loudness begin="35" end="64"/>
        <aggressiveness begin="5" end="8"/>
        <melodic begin="14" end="40"/>
        <spokenness begin="40" end="94"/>
        <vocal-to-instrumental begin="2.0" end="5.0"/>
    </group>
</model>
```

---

As shown in Example 1, the model specifies a first grouping of musical content and a second grouping of musical content that a particular user has an affinity towards. In the depicted example, the first grouping of musical content specifies the acoustical characteristics of the "Rock" genre, an era within the range of "1988-1999", a tempo within the range of "75-140" beats per minute, and so on. Similarly, the second grouping of musical content specifies the acoustical characteristics of the genre "Hip Hop", an era of "1981-1995", a tempo within the range of "95-135" beats per minute, and so on. Of note, while the depicted model specifies the characteristics of genre, era, tempo, loudness, aggressiveness, melodicness, spokenness, and vocal-to-instrumental ratio, such characteristics are provided for illustrative purposes only and without limitation. More generally, any characteristics that are in any way descriptive of musical content can be included in a cluster model, consistent with the functionality described herein. Moreover, while the above example is formatted in an XML format, such a depiction is for illustrative purposes and more generally any way of representing acoustical characteristics data can be used.

In creating the model for a particular user (e.g., user A), the playlist creation component 115 could discover user A's media 130 that includes the user's media library 135, instances of streaming media 140 the user has listened to and radio stations 145 (e.g., broadcast radio, streaming radio, etc.) the user has listened to. Similarly, the playlist creation component 115 could discover user B's media 150, which includes the user's media library 155, streaming media information 160 and radio information 165. In addition, the playlist creation component 115 can discover metadata describing the user's past interactions with particular musical content. For example, such metadata could specify how many times the user listened to a particular instance of musical content in the music library 135, user feedback provided for a particular instance of musical content (e.g., selected a "like" option for the content, selected a "did not like" option, listed the content as a "favorite," etc.), whether the user changed to a different radio station or otherwise stopped playback of the current radio station during a particular song, and so on.

In one embodiment, the media entertainment device 110 is configured with a network adapter in order to facilitate communications over a communications network (e.g., the Internet). In such an embodiment, the playlist creation component 115 could transmit identification information for the users 120 to a remote server (e.g., a service deployed within a cloud computing environment) which maintains the preference models for the users 120. The remove server could then return the individual preference models for the identified users 120 to the playlist creation component 115, for use in creating a playlist for the users 120. Such an embodiment that includes a centralized server may be preferable, for instance, where the users wish their preference models to be available on multiple different media entertainment devices 110. Moreover, maintaining a single, centralized preference model based on a user's listening patterns and feedback across multiple media entertainment devices may improve the accuracy of the preference model, relative to maintaining separate preference models on each of the individual media entertainment devices, as all of the user's information can be consolidated in the centralized preference model as opposed to spread out across multiple separate models.

Additionally, the playlist creation component 115 (or, e.g., another instance of the playlist creation component 115 executing on the remote server) can maintain a plurality of different groups of users, where each group corresponds to a grouping of users who share common musical interests. In determining the individual preferences of a particular user, the playlist creation component 115 could classify the user into one of the groups of users and could estimate the particular user's preferences based on the preferences of the group of users. For instance, the playlist creation component 115 could classify the user based on metadata describing the user (e.g., the user's age, geographic location, etc.), the user's known musical preferences (e.g., the user has already shown a strong interest in a particular genre of music, a particular artist, etc.) and so on. Doing so allows the playlist creation component 115 to quickly and accurately estimate the user's preferences. Subsequently, the playlist creation component 115 can continue to refine the group preference model as well as the user's classification. For example, the playlist creation component 115 could incorporate the user's particular preferences back into the group's preference model to refine the model and can potentially reclassify the particular user into a group that better fits the user's preferences as the playlist creation component 115 learns more about the user's individual preferences.

Upon generating or otherwise obtaining each user's 120 individual preference model, the playlist creation component 115 can generate a shared preference model describing common musical preferences between the users 120, based on the respective preference information for each of the two or more users. The playlist creation component 115 can then create a playlist including musical selections from the library of available musical content, based on the shared preference model. The playlist creation component 115 could generate the playlist to include musical selections that directly match all of the individual preference models for the users 120, as well as related content discovery content that does not directly match at least one of the users' 120 individual preference models.

For example, a particular instance of discovery content could match only a subset of the users' 120 individual preference models (e.g., user A's model but not user B's model), but upon determining that the particular instance of content is similar or related to content user B has historically enjoyed (i.e., as indicated by user B's individual preference model), the playlist creation component 115 could include the particular instance of discovery content in the playlist. As another example, the playlist creation component 115 could employ a machine learning algorithm to determine discovery content that is not included in any of the user's media libraries 130 but that the users 120 are likely to enjoy, based on the combined preference model, and could include such content in the created playlist. Doing so provides an intelligent way to expose the users 120 to new, undiscovered musical content that is likely to match their musical preferences.

Once the playlist creation component 115 has created the combined preference model, the playlist creation component 115 can continue to refine the combined preference model over time based on the behavior of the corresponding two or more users. For instance, the playlist creation component 115 can monitor user feedback and user listening behavior of the two or more users while the two or more users are together listening to a playlist created using the combined preference model, and can use this information to refine the combined preference model. As an example, the playlist creation component 115 could determine that the users frequently provide negative feedback for particular musical selections in the playlist (e.g., musical content from a particular artist, a particular era, a particular genre, having particular acoustical characteristics, some combination thereof, etc.), and in response, could refine the combined preference model to avoid selecting such content in future playlists (e.g., explicitly specifying disliked content having particular attributes, removing data showing an affinity to content having the particular attributes, etc.). Moreover, the playlist creation component 115 can continue to refine the individual preference models for each of the users, while the users are not together and listening to music selected using the combined preference model. Upon detecting the two or more users are together within the same physical environment once again, the playlist creation component 115 can refine the combined preference model for the users based on the refined individual preference models for the users. For example, if one of the users has started listening to a new album or genre of music since the last time the combined preference model was updated and if the playlist creation component 115 determines that the other user(s) are likely to enjoy such a new album or genre of music (e.g., based on the individual preference models of the other user(s)), the playlist creation component 115 could update the combined preference model to specify an affinity towards the new album or genre of music.

Figure 2:
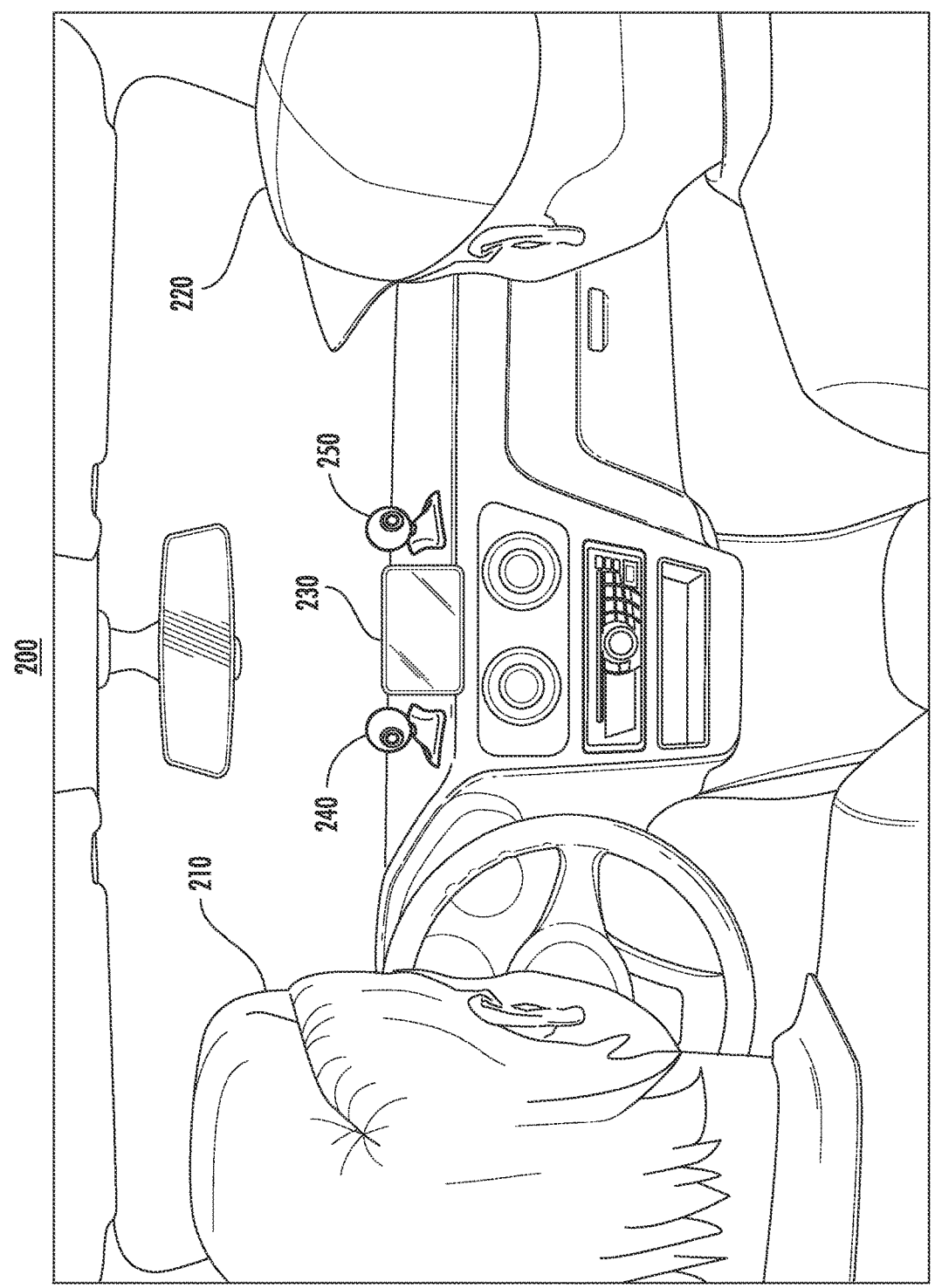
FIG. 2 illustrates a vehicle with a media player configured with a playlist creation component, according to one embodiment described herein.

FIG. 2 illustrates a vehicle with a media player configured with a playlist creation component, according to one embodiment described herein. As shown, the illustration 200 includes users 210 and 220, a media player device 230 and cameras 240 and 250. As discussed above, the playlist creation component 115 on the media player device 230 could identify the users 210 and 220 within the physical environment (i.e., the vehicle's cabin, in the depicted example) and could generate a shared preferences model based on the musical preferences of the users 210 and 220. For instance, the playlist creation component 115 could capture images of the users 210 and 220 using the cameras 240 and 250, respectively, and could perform a facial recognition analysis on the captured images to identify the users 210 and 220. For example, the playlist creation component 115 could maintain user profiles for all recognized users and each user profile could include facial image information for the respective user. The playlist creation component 115 could then identify the users 210 and 220 based on which user profiles include facial image information that match the captured images. The playlist creation component 115 could then generate a shared preferences model based on individual preference models for each of the identified users 210 and 220, and could use the shared preferences model to generate a playlist for the users 210 and 220 by selecting instances of available musical content that match the preferred acoustical characteristics described by the shared preferences model.

In one embodiment, the playlist creation component 115 is configured to weigh the users' 210 and 220 preferences differently in generating the combined model. For example, the playlist creation component 115 could assign a stronger weight to the model describing the individual preferences of the vehicle's driver 210, relative to the model describing the passenger's musical preferences 220. Thus, the playlist creation component 115 could consider the driver's individual media preferences more than the passengers preferences, while still taking the passengers' media preferences into account, when generating the combined media preferences model. Doing so can keep the driver more engaged in the playback of the playlist, which in turn can help keep the driver more alert while operating the vehicle. In one embodiment, the playlist creation component 115 allows the users to manually configure whether and how their individual preferences should be weighted, relative to one another. More generally, however, any technique for assigning weights to the users can be used, consistent with the functionality described herein.

Figure 3:
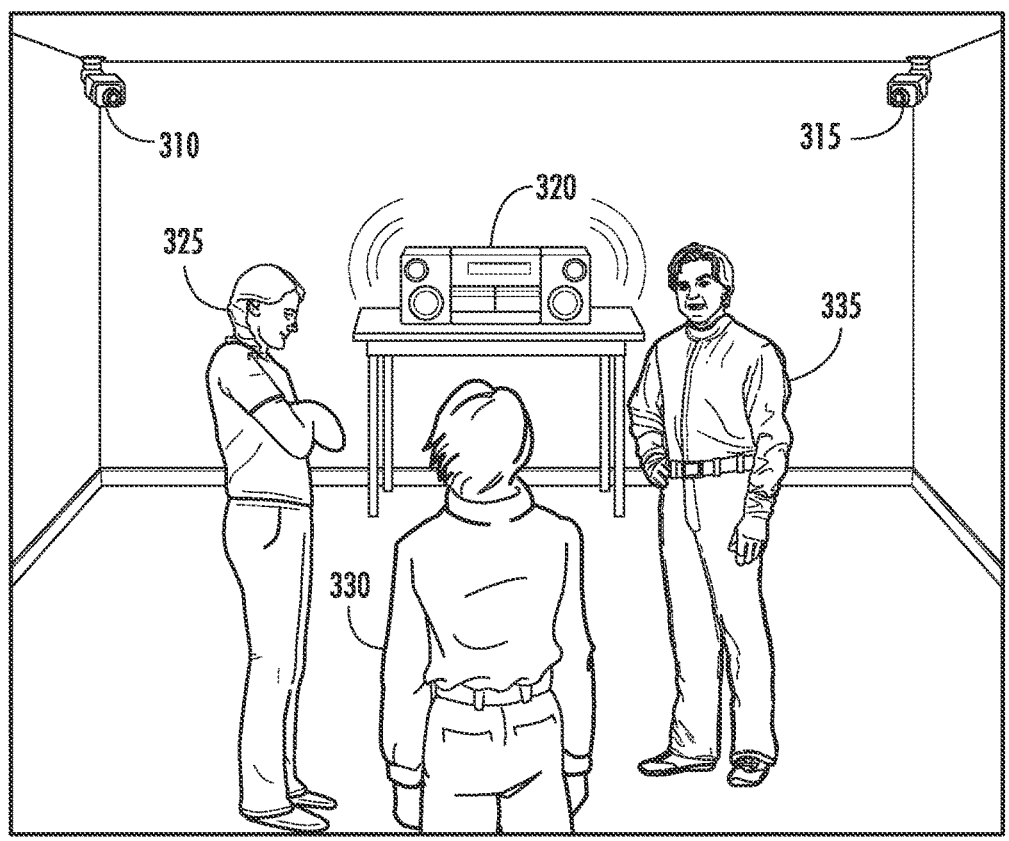
FIG. 3 illustrates a room with a media player configured with a playlist creation component, according to one embodiment described herein.

FIG. 3 illustrates a room with a media player configured with a playlist creation component, according to one embodiment described herein. As shown, the illustration includes camera devices 310 and 315, a media player device 320, and users 325, 330 and 335. As discussed above, the media player device 320 could be configured with a playlist creation component 115 that is configured to generate a playlist based on the shared musical preferences of the users 325, 330 and 335. For example, the playlist creation component 115 could capture pictures of the physical environment using the cameras 310 and 315 and could transmit the pictures to a remote server (e.g., via a network connection to the Internet). A remote server could perform a facial recognition analysis on the pictures to identify the users 325, 330 and 335 as present within the physical environment. The remote server could further access user profiles associated with each of the users 325, 330 and 335 to retrieve individual preference models for the users 325, 330 and 335. As discussed above, such individual preference models could be formed based on any information relating to a user's musical preferences, with examples including (without limitation) music in the user's personal library, data describing how often the user listens to particular selections of music, data describing the genres of music the user listens to, data describing how often the user listens to various genres, radio stations the user listens to, feedback provided by the user for various musical content, other feedback provided by the user for artists, genres, radio stations, and so on.

The remote server could then generate a shared preferences model for the users 325, 330 and 335 describing preferred acoustical characteristics that the users 325, 330 and 335 have in common. The remote server could then transmit the shared preference model to the playlist creation component 115 on the media player 320. Upon receiving the shared preference model, the playlist creation component 115 could generate a playlist by selecting available content that matches the acoustical preferences described by the shared preference model. Such available content could be, e.g., content available locally on a storage device of the media player 320, available on storage of one or more mobile devices carried by the users 325, 330 and 335 and made available to the playlist creation component 115 via an application programming interface (API), available for streaming (e.g., an online music streaming service for a user's personal musical library, an online radio service, etc.) over a network connection using a network adapter of the media player device 320, and so on. The playlist creation component 115 could then initiate playback of the selected instances of musical content on the media player device 320.

In addition to using cameras (e.g., cameras 310 and 315) to identify the user through facial recognition techniques, it is broadly contemplated that any number of different identification techniques or combinations of techniques can be used, consistent with the present disclosure. For example, the playlist creation component 115 could access identification information (e.g., a media access control (MAC) address) of a mobile device (e.g., a mobile phone, a smart watch, etc.) each user is carrying and could identify the users using this device identification information (e.g., by comparing the identification information to predefined identification information recorded in a user profile). Generally, it is preferable for the playlist creation component 115 to access the user devices using wireless data communications (e.g., Bluetooth communications, WiFi communications, RFID, etc.), although more generally any communications medium can be used.

As another example, the playlist creation component 115 could use biometric sensors within the physical environment. For example, the playlist creation component 115 could receive data from a remote heart sensing device specifying heart rate information collected from a user within the physical environment and could correlate the data to prerecorded user heart rate data in one of the user profiles to identify the user. As yet another example, the playlist creation component 115 could use data from a remote heat sensing device to determine an approximate body composition and size of a user within the physical environment (e.g., based on the size of the heat signature in the data received from the remote heat sensing device). Generally, while such heat signatures may be too imprecise for identifying specific users, the playlist creation component 115 can be configured to employ sensor fusion techniques in identifying the users, where the playlist creation component 115 uses data collected from multiple different sensors to perform the user identification. For example, the playlist creation component 115 could quickly eliminate certain users from consideration based on the heat signature information (e.g., if the heat signature indicates the detected user is an adult sized individual, the playlist creation component 115 could eliminate all user profiles pertaining to children from further consideration in identifying the user). Doing so allows the playlist creation component 115 to more accurately and more quickly identify users within the physical environment, as the playlist creation component 115 can quickly remove particular user profiles that clearly do not correspond to the detected user from further consideration, thereby avoiding having to perform wasteful facial recognition analysis operations for these user profiles.

Figure 4:
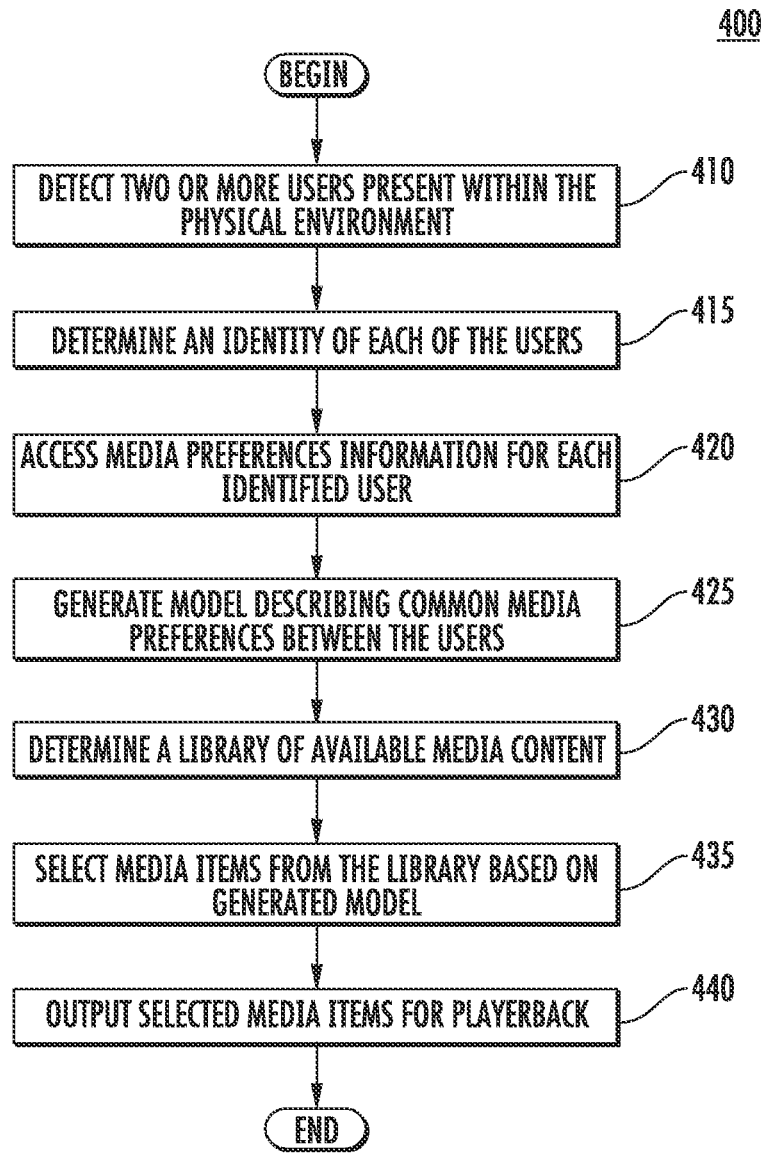
FIG. 4 is a flow diagram illustrating a method of creating a multi-user playlist, according to one embodiment described herein.

FIG. 4 is a flow diagram illustrating a method of creating a multi-user playlist, according to one embodiment described herein. As shown, the method 400 begins at block 410, where the playlist creation component 115 detects two or more users present within the physical environment. Generally, the physical environment represents the immediate area around a media player device on which the playlist creation component 115 is deployed. For example, where the playlist creation component 115 is deployed on a media player device within a vehicle, the physical environment could represent the cabin of the vehicle.

In detecting the two or more users, the playlist creation component 115 can be configured to use a number of different techniques or a combination thereof. For example, the playlist creation component 115 could capture an image(s) of the physical environment using camera sensors. As another example, the playlist creation component 115 could detect the voices of the users using one or more microphone devices. As yet another example, the playlist creation component 115 could detect the users based on collected biometric data. As an example, the playlist creation component 115 could receive weight data from weight sensors positioned within each seat of a vehicle and could determine which seats are currently occupied based on the weight data exceeding a threshold amount of weight.

The playlist creation component 115 then determines an identity of each of the detected users (block 415). For example, the playlist creation component 115 could perform a facial recognition algorithm on the images of the physical environment captured using the camera sensors in order to identify recognizable user faces. As another example, the playlist creation component 115 could perform a voice recognition analysis to match the users' voices with predefined voice information corresponding to recognized users. Moreover, the playlist creation component 115 can consider the biometric data for the users in identifying the users. For instance, the playlist creation component 115 could restrict the identification analysis to a subset of recognized users based on the user's biometric data. As an example, the playlist creation component 115 could determine that a particular user's biometric data indicates that the user currently weighs 180 pounds and, in response, the playlist creation component 115 could restrict the identification analysis for the particular user to only those users having a weight within a predefined range of 180 pounds. Doing so allows the playlist creation component 115 to improve the accuracy of the identification analysis.

Once the users are identified, the playlist creation component 115 accesses media preferences information for each of the identified users (block 420). Generally, the media preferences information represents a model describing a particular user's musical preferences. For example, such a model could describe acoustical characteristics of musical content the user has previously indicated shown an affinity towards. The playlist creation component 115 could retrieve a locally stored media preferences model determined from the user's previous behavior relating to a media device on which the playlist creation component 115 is deployed (e.g., within a vehicle). For example, the playlist creation component 115 have previously generated such a model based on the user's interactions with the vehicle's media player device (e.g., providing an explicit indication of liking or disliking particular musical content, changing the radio station while particular content is playing, listen to certain instances of musical content or types of musical content repeatedly, etc.). As another example, where a network connection is available (e.g., to the Internet), the playlist creation component 115 could retrieve the user preferences information from a remote server. For example, the playlist creation component 115 could submit a request to such a server over the network specifying identification information for each of the identified users and the server could return a respective model for each of the identified users describing acoustical characteristics of musical content preferred by the respective user.

Once the playlist creation component 115 has accessed the media preferences model for each identified user, the playlist creation component 115 generates a combined model describing shared musical preferences between all of the two or more users (block 425). For instance, the playlist creation component 115 could first identify acoustical characteristics that all of the identified users have at least some affinity towards. For example, the playlist creation component 115 could determine that the models for two particular users indicate that both users enjoy classic rock music. As such, the playlist creation component 115 could generate a combined model for the two users that specifies a preference for classic rock music.

The playlist creation component 115 could further determine how strong of a preference to assign based on the respective preference strengths specified in the users' individual media preference models. For example, the playlist creation component 115 could determine that a first one of the users has a very strong preference for the classic rock genre while the second user has a weaker preference for the genre. As such, the playlist creation component 115 could take both individual preference values into account and could determine a combined preference strength value to include in the combined preferences model. Thus, in the present example, the playlist creation component 115 could average the strong preference value with the weak preference value and could determine that the combined preference model should include a moderate preference value for the genre of classic rock music.

In one embodiment, the playlist creation component 115 is configured to weigh the individual preferences of the users differently in generating the combined model. For example, in an embodiment where the playlist creation component 115 resides on a media player within a vehicle, the playlist creation component 115 could assign a stronger weight to the individual preferences of the vehicle's driver relative to the passenger(s) in the vehicle. Thus, in such an example, the playlist creation component 115 could consider the driver's individual media preferences more than the passengers preferences, while still taking the passengers' media preferences into account, when generating the combined media preferences model. In one embodiment, the playlist creation component 115 allows the users to manually configure whether and how their individual preferences should be weighted, relative to one another. More generally, however, any technique for assigning weights to the users can be used, consistent with the functionality described herein.

Additionally, the playlist creation component 115 determines a library of available media content (block 430). For example, the playlist creation component 115 may identify locally accessible media content that is available for playback. Generally, as used herein, media content is locally available when the media content is stored on a storage media within the physical environment and is remotely available when the media content must be streamed from a remote network (e.g., from a remote server over the Internet). For instance, in an embodiment where the playlist creation component 115 resides within a vehicle, locally accessible media content could be stored on a storage device managed directly by the vehicle's media player device, on a portable device communicatively coupled to the vehicle's media player device (e.g., a portable music device connected via a wired connection, a mobile device connected via a wireless connection, etc.), on a portable storage media (e.g., a CD or DVD-ROM), and so on.

If the playlist creation component 115 determines that a network connection is available for streaming remote content, the playlist creation component 115 can include remotely available content in the library of available media content. Such content can include remote musical selections owned by one of the users within the vehicle (e.g., musical selections contained in cloud storage corresponding to one of the users), musical selections licensed by a streaming music service to which one of the users belongs, publicly available streaming music sources, and so on.

The playlist creation component 115 then generates a combined playlist for the identified users by selecting media items from the library of available media content using the combined model (block 435). Generally, the playlist creation component 115 is configured to select media items from the available library that substantially match the preferences of all users identified within the physical environment. For instance, if the playlist creation component 115 determined that the only preferred musical genre all the users have in common is classic rock, the playlist creation component 115 could select media files from the available library the belong or are closely related to the classic rock genre. Continuing the example, if the playlist creation component 115 determined in generating the combined model that a particular one of the users strongly dislikes certain classic rock songs (e.g., songs by a particular artist, songs from a particular era, songs from a particular sub-genre, etc.), the playlist creation component 115 could avoid selecting such songs from the available library in order to accommodate the particular user's preferences. Once the playlist is generated, the playlist creation component 115 outputs the selected media items for playback (block 440), and the method 400 ends.

Figure 5:
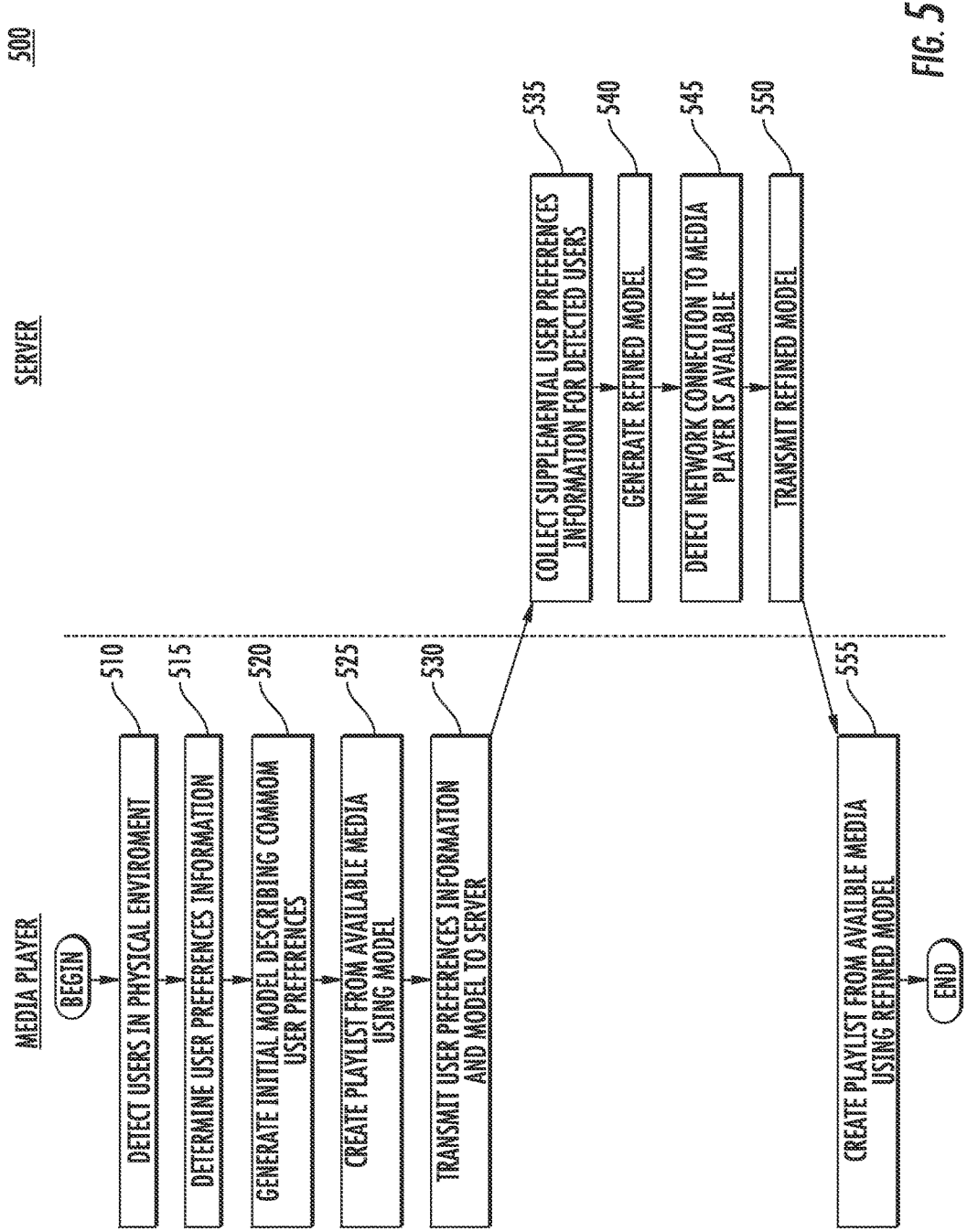
FIG. 5 is a flow diagram illustrating a method of creating and refining a multi-user playlist, according to one embodiment described herein.

FIG. 5 is a flow diagram illustrating a method of creating and refining a multi-user playlist, according to one embodiment described herein. As shown, the method 500 begins at block 510, where the playlist creation component 115 on a media player device detects users present within the proximate physical environment. As discussed above, the playlist creation component 115 can use a number of different techniques to identify which users are present, including facial recognition, voice recognition, biometric data recognition, and so on. The playlist creation component 115 then determines user preferences information for each of the identified users (block 515). For example, the playlist creation component 115 could retrieve an individual preferences model from a respective user profile for each of the users that describes the respective user's musical preferences.

The playlist creation component 115 then generates an initial shared preferences model describing common user preferences across all of the identified users (block 520). In generating the initial preferences model, the playlist creation component 115 can take into account all preferences data that is currently available to the media player. For example, in an embodiment where the media player is implemented within an automobile, the playlist creation component 115 may not consistently have a network connection available for use in accessing remote preference information for the users (e.g., a centrally stored user profile for each user containing the user's individual preferences model). As such, the playlist creation component 115 could generate the initial preferences model using locally available user preference data (e.g., previously used preference models for the users, preference information obtained from monitoring the user's behavior with respect to the media player, the composition of the user's local media library, metadata describing the user's playback of items within the user's local media library, etc.).

In one embodiment, when generating the shared preferences model, the playlist creation component 115 can be configured to weight the individual preferences of each various identified users differently. For example, the playlist creation component 115 could be configured to assign a greater weight to the preferences of one user (e.g., the driver of an automobile) relative to the preferences of another user (e.g., a passenger within the automobile). Once the initial shared preferences model is created, the playlist creation component 115 creates a playlist using the initial shared preference model by selecting instances of available musical content matching the model. As discussed above, the playlist creation component 115 can also be configured to facilitate the process of music discovery for the users by selecting at least one instance of musical content that is determined to be new to at least one of the users. Generally, in selecting discovery content, the playlist creation component 115 can select content that is determined to be enjoyable to all of the identified users. For example, the playlist creation component 115 could select discovery musical content that is acoustically similar to instances of musical content that directly match the musical preferences described in the initial shared preferences model.

Additionally, in the depicted method 500, the playlist creation component 115 transmits the user preferences information and initial shared preferences model to a remote server via a network connection (block 530). For example, the playlist creation component 115 could transmit the model using a network connection established using a network adapter of the media player device hosting the playlist creation component 115. As another example, the playlist creation component 115 on the media player device could access an API of a mobile device of one of the users and could utilize a network connection of the mobile device to transmit the model to the remote server. More generally, it is broadly contemplated that any suitable network connection could be used to transmit the model, consistent with the functionality described herein.

Upon receiving the model, a playlist creation component 115 on the remote server collects supplemental user preferences information for the detected users within the media player's surrounding physical environment (block 535). For example, the playlist creation component 115 on the remote server could access a centrally maintained user profile for each of the users to obtain a centralized individual preferences model for the users. Additionally, the playlist creation component 115 could access APIs for additional services that the users have provided access to. Examples of such additional services include social networking services, content streaming services (e.g., streaming Internet radio stations, streaming video services, etc.). More generally, it is broadly contemplated that the playlist creation component 115 can access any supplemental information which reflects the user's musical preferences.

The playlist creation component 115 then generates a refined shared preference model, using the supplemental preferences information obtained for the users (block 540). Generally, in this example, since the playlist creation component 115 on the remote server has access to more user preference information than the playlist creation component 115 on the media player, the refined shared preference model generated by the playlist creation component 115 will be a more accurate representation of the shared musical preferences of the identified users, thereby leading to improved playlist creation using the refined model. As another example, the playlist creation component 115 on the remote server (e.g., deployed within a cloud computing environment) could maintain user group information defining groups of users who share common musical interests, and the playlist creation component 115 could classify each of the identified users into one of these groups. The playlist creation component 115 could then refine each user's individual preference model based on the preferences of the selected group. That is, since the user is determined to be similar to the other users in the group in a number of ways, the playlist creation component 115 could determine that the particular user may share additional musical interests with the members of the group, and could incorporate such additional musical interest information into the particular user's individual preference model. For example, a user's individual preference model could initially specify that the user has a strong preference for 90's alternative rock. Upon classifying the user into a group of similar users, the playlist creation component 115 could determine that a preference model for the group specifies a preference for 90's grunge rock and 80's metal music, and the playlist creation component 115 could incorporate such preferences into the particular user's individual model as well. For example, the playlist creation component 115 could initially incorporate such preference information into the user's model as a weak preference towards these types of music and could refine that preference (e.g., to strengthen it or to remove it altogether) based on the particular user's actions going forward.

The playlist creation component 115 on the server transmits the refined model to the media player via a network connection (block 550) and the playlist creation component 115 on the media player, upon receiving the refined model, creates an updated playlist from the library of available media sources using the refined model (block 555), and the method 500 ends.

Figure 6:
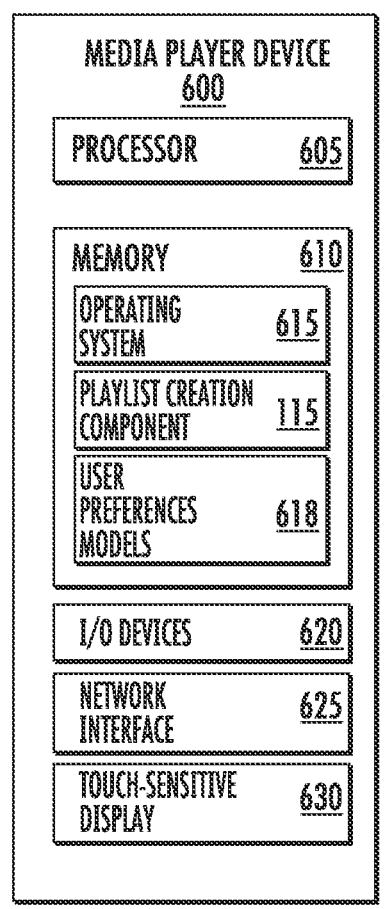
FIG. 6 is a block diagram illustrating a system configured with a playlist creation component, according to one embodiment described herein.

FIG. 6 is a block diagram illustrating a media player device configured with a playlist creation component, according to one embodiment described herein. In this example, the media player device 600 includes, without limitation, a processor 605, memory 610, I/O devices 620, a network interface 625 and a touch-sensitive display device 630. Generally, the processor 605 retrieves and executes programming instructions stored in the memory 610. Processor 605 is included to be representative of a single CPU, multiple CPUs, a single CPU having multiple processing cores, GPUs having multiple execution paths, and the like. The memory 610 is generally included to be representative of a random access memory. The network interface 625 enables the media player device 600 to connect to a data communications network (e.g., wired Ethernet connection or an 802.11 wireless network). The media player device 600 may further include a Bluetooth transceiver module for use in communicating with other devices. Further, while the depicted embodiment illustrates the components of a media device 600, one of ordinary skill in the art will recognize that embodiments may use a variety of different hardware architectures. Moreover, it is explicitly contemplated that embodiments may be implemented using any device or computer system capable of performing the functions described herein.

The memory 610 represents any memory sufficiently large to hold the necessary programs and data structures. Memory 610 could be one or a combination of memory devices, including Random Access Memory, nonvolatile or backup memory (e.g., programmable or Flash memories, read-only memories, etc.). In addition, memory 610 may be considered to include memory physically located elsewhere; for example, on another computer or device communicatively coupled to the media player device 600. Illustratively, the memory 610 includes an operating system 615, a playlist creation component 115 and user preferences models 618. The operating system 615 generally controls the execution of application programs on the media player device 600. Examples of operating system 615 include UNIX, a version of the Microsoft Windows® operating system, and distributions of the Linux® operating system. Additional examples of operating system 615 include custom operating systems for gaming consoles, including the custom operating systems for systems such as the Nintendo DS® and Sony PSP®, as well as operating systems configured for mobile devices such as Apple iOS®.

The I/O devices 620 represent a wide variety of input and output devices, including displays, keyboards, touch screens, and so on. For instance, the I/O devices 620 may include a set of buttons, switches or other physical device mechanisms for controlling the media player device 600. For example, the I/O devices 620 could include a set of directional buttons used to control aspects of a video game played using the media player device 600. In the context of the present disclosure, the I/O devices 620 can include at least one audio output device configured to project a steerable beam of sound. Examples of such I/O devices 620 include a beam forming speaker array and an actuated directional speaker. More generally, however, any device capable of projecting a directional beam of sound can be used, consistent with the present disclosure. Additionally, as discussed above, some embodiments may project visual content, in addition to or in lieu of an audio projection. For example, such an embodiment could be configured with a steerable micro projector capable of projecting visual content into the physical environment. More generally, however, any device capable of projecting visual content can be used. Moreover, the I/O devices 620 can include a camera device(s) and microphone(s), for use in detecting user actions and for determining a direction the user is located in, relative to the media player device 600. The touch-sensitive display 630 can be used for outputting a graphical user interface for the media player device 600 (e.g., an interface generated by the operating system 615) and can also be used to detect gestures performed by a user of the media player device 600.

As discussed above, the playlist creation component 115 could identify two or more users present with the media player device's 600 physical environment and could determine preference information describing each user's musical preferences. The playlist creation component 115 could then determine common musical preferences shared between the two or more users, based on the respective preference information for each of the two or more users. For example, the playlist creation component 115 could generate a user preference model 618 describing preferred acoustical properties of musical content that are shared between the two or more users present within the physical environment. Additionally, the playlist creation component 115 identifies a library of available musical content for the two or more users. Such available musical content can be available for playback locally from a storage device of the media player device 600 or from a storage device directly coupled to the media player device (e.g., via a wired or wireless connection). Additionally, such available musical content can also be available remotely for streaming over the network interface 625. The playlist creation component 115 then creates a playlist of two or more musical selections from the library of available musical content, using the generated user preference model 618. Doing so provides a playlist that is tailored to match the musical preferences of all identified users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments of the invention. However, it should be understood that the present disclosure is not limited to specific described embodiments. Instead, any combination of the aforementioned features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the present disclosure. Thus, the aforementioned aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, the aspects described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the playlist creation component 115 could be deployed on a node within the cloud and could receive requests (e.g., from another instance of the playlist creation component 115 deployed on a media player device) specifying users identified within a physical environment. The playlist creation component 115 could then access centralized user preference data for the identified users maintained within the cloud computing environment and could generate a shared preferences model for all of the identified users, based on individual preference models for each of the users. Such a shared preference model could then be returned responsive to the request. Doing so allows the user preference information to be queried from any computing device attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing computer code that, when executed, performs an operation comprising:
   capturing one or more images of a physical environment;
   identifying two or more users in the physical environment by analyzing the one or more images;
   in response to identifying the two or more users, retrieving, for each of two or more identified users, a respective musical preferences model representing a plurality of acoustical characteristics of musical content determined based on preferences of the respective user;
   generating a common musical preferences model representing a set of common acoustical characteristics of musical content for the two or more identified users, based on the musical preferences models for each of the two or more identified users;
   identifying a library of available musical content; and
   creating a playlist of two or more musical selections from the library of available musical content, based on the common musical preferences model.

2. The non-transitory computer-readable medium of claim 1, wherein:
   the one or more images of the physical environment are captured using one or more camera sensors; and
   identifying the two or more users in the physical environment comprises:
      analyzing the one or more images to determine a plurality of faces within the one or more images; and
      determining a correlation exists between the plurality of faces and predefined facial information corresponding to the two or more users.

3. The non-transitory computer-readable medium of claim 1, wherein identifying the library of available musical content further comprises:
   determining a plurality of musical selections that are accessible for local playback.

4. The non-transitory computer-readable medium of claim 3, wherein identifying the library of available musical content further comprises:
   determining a communications network is available for streaming content for playback; and determining a plurality of streaming music channels available for streaming content using the communications network.

5. The non-transitory computer-readable medium of claim 4, the operation further comprising:
upon determining that the communications network is no longer available, modifying the created playlist to only include musical selections that are accessible for local playback.

6. The non-transitory computer-readable medium of claim 1, wherein retrieving, for each of the two or more identified users, a respective musical preferences model representing a plurality of acoustical characteristics of musical content determined based on preferences of the respective user further comprises:
identifying a plurality of musical selections each respective user has previously listened to;
determining, for each of the plurality of musical selections, a measure of user ratings provided by each respective user for the respective musical selection; and
generating the musical preferences model for each respective user describing selections of musical content for which the respective user provided positive user ratings.

7. The non-transitory computer-readable medium of claim 5, wherein retrieving, for each of the two or more identified users, a respective musical preferences model representing a plurality of acoustical characteristics of musical content determined based on preferences of the respective user further comprises:
identifying a class of musical content having an association with each respective user; and
determining a measure of user ratings provided by each respective user for the class of musical content,
wherein generating the musical preferences model for each respective user is further based on the identified classes of musical content and the determined measures of user ratings provided for the classes of musical content.

8. The non-transitory computer-readable medium of claim 1, wherein creating the playlist of two or more musical selections from the library of available musical content, based on the common musical preferences model, further comprises:
selecting instances of musical content from the library of available musical content, based on determining a correlation exists between the selected instances of musical content and the set of common acoustical characteristics.

9. The non-transitory computer-readable medium of claim 1, wherein generating a common musical preferences model representing a set of common acoustical characteristics of musical content for the two or more users, based on musical preferences models for each of the two or more users, further comprises:
generating a local model representing common acoustical properties preferred by all of the two or more identified users;
transmitting, over a communications network, a message specifying at least the identity of the two or more identified users; and
receiving, over the communications network, the common musical preferences model the two or more users, wherein the common musical preferences model is generated by refining the generated local model.

10. The non-transitory computer-readable medium of claim 1, wherein generating a common musical preferences model representing a set of common acoustical characteristics of musical content for the two or more identified users, based on musical preferences models for each of the two or more identified users, further comprises:
refining the common musical preferences model for the two or more identified users, based on a measure of user ratings provided by one of the two or more identified users.

11. The non-transitory computer-readable medium of claim 10, wherein generating a common musical preferences model representing a set of common acoustical characteristics of musical content for the two or more identified users, based on musical preferences models for each of the two or more identified users, further comprises:
refining the respective musical preferences model for one of the two or more identified users, based on user ratings for the respective user; and
refining the generated common musical preferences model for the two or more identified users, based on the refined musical preference model for the user.

12. A system, comprising:
one or more sensors configured to capture one or more images of a physical environment;
logic that, when executed, performs an operation comprising:
identifying two or more users in the physical environment by analyzing the one or more images;
in response to identifying the two or more users, retrieving, for each of the two or more users, a respective musical preferences model representing a plurality of acoustical characteristics of musical content determined based on preferences of the respective user;
generating a common musical preferences model representing a set of common acoustical characteristics of musical content for the two or more users, based on musical preferences models for each of the two or more users;
identifying a library of available musical content; and
creating a playlist of two or more musical selections from the library of available musical content, based on the common musical preferences model.

13. The system of claim 12, wherein the one or more sensors configured to identify two or more users comprise:
one or more camera sensors configured to capture the one or more images of the physical environment; and
logic that, when executed, performs an operation comprising:
analyzing the one or more images to determine a plurality of faces within the one or more images; and
determining a correlation exists between the plurality of faces and predefined facial information corresponding to the two or more users.

14. The system of claim 13, wherein the one or more sensors further comprise:
one or more biometric sensors configured to capture biometric information for each of the two or more users;
logic that, when executed, performs an operation comprising:
for each of the two or more users, determining a correlation exists between the biometric information captured for the respective user and predefined biometric information corresponding to the respective user.

15. The system of claim 13, wherein the one or more sensors further comprise:

one or more communication devices configured to receive device identification information from one or more user devices; and logic that, when executed, performs an operation comprising:

for each of the two or more users, determining a correlation exists between the device identification information received from the one or more user devices and predefined device identification information corresponding to the respective user.

16. The system of claim 12, further comprising:

a communications adapter configured to connect to a communications network, and logic that, when executed, performs an operation comprising:

detecting that the communications network is available for streaming content for playback using the communications adapter;

determining a plurality of streaming music channels available for streaming content using the communications network; and upon determining that the communications network is no longer available, modifying the created playlist to only include musical selections that are accessible for local playback.

17. A method, comprising:

capturing one or more images of a physical environment;

identifying two or more users in the physical environment by analyzing the one or more images;

in response to identifying the two or more users, determining, for each of the two or more users, a respective musical preferences model representing a plurality of acoustical characteristics of musical content determined based on preferences of the respective user;

generating a common musical preferences model representing a set of common acoustical characteristics of musical content for the two or more users, based on the musical preferences models for each of the two or more users; and transmitting, over a communications network, to a media playback device, the generated model for use in creating a playlist of two or more musical selections from a library of available musical content.

18. The method of claim 17, wherein the request further specifies an initial musical preferences model describing a set of common acoustical characteristics of musical content for the two or more users, and wherein generating the common musical preferences model further comprises refining the initial musical preferences model based on the respective musical preferences models for each of the two or more users.

19. The method of claim 17, wherein determining, for each of the two or more users, a respective musical preferences model representing a plurality of acoustical characteristics of musical content determined based on preferences of the respective user, further comprises:

determining one or more radio stations a first one of the two or more users has previously listened to;

determining user feedback information for the first user with respect to the one or more radio stations; and modifying the respective musical preferences model for the first user with respect to an instance of media content from the one or more radio stations, based on monitored behavior of the first user while the instance of media content was playing on the one or more radio stations.

20. The method of claim 17, wherein determining, for each of the two or more users, a respective musical preferences model representing a plurality of acoustical characteristics of musical content determined based on preferences of the respective user, further comprises:

determining one or more social network interactions for a first one of the two or more users relating to a class of musical content; and determining that the first user has a positive preference for the class of musical content, based on the one or more social network interactions.

21. The non-transitory computer-readable medium of claim 1, wherein generating the common musical preferences model comprises determining a set of common acoustical characteristics describing selections of musical content for which all of the two or more identified users have provided positive user ratings, wherein the selections of musical content for which all of the two or more identified users have provided positive user ratings comprise selections of musical content for which all of the two or more identified users have provided a selection of a like option or a favorite listing.

22. The non-transitory computer-readable medium of claim 1, wherein generating the common musical preferences model comprises determining a set of common acoustical characteristics describing selections of musical content for which all of the two or more identified users have provided positive user ratings, wherein a positive user rating for a selection of musical content comprises a user selection of a like option for the selection of musical content or a user listing the selection of musical content as a favorite.

* * * * *